(12) United States Patent
Jain et al.

(10) Patent No.: US 11,257,003 B2
(45) Date of Patent: Feb. 22, 2022

(54) METHODS AND SYSTEMS FOR POLICY-BASED ENRICHMENT OF CONTENT BASED ON LEARNING CONTEXT

(71) Applicants: Kalpit Jain, San Jose, CA (US); Neil Reddy Chintala, Milipitas, CA (US); Zhi Feng Huang, San Jose, CA (US); Kaushal Mehta, Fremont, CA (US); Alok Nandan, Santa Clara, CA (US)

(72) Inventors: Kalpit Jain, San Jose, CA (US); Neil Reddy Chintala, Milipitas, CA (US); Zhi Feng Huang, San Jose, CA (US); Kaushal Mehta, Fremont, CA (US); Alok Nandan, Santa Clara, CA (US)

(*) Notice: Subject to any disclaimer, the term of this patent is extended or adjusted under 35 U.S.C. 154(b) by 825 days.

(21) Appl. No.: 15/975,750

(22) Filed: May 9, 2018

(65) Prior Publication Data
US 2019/0130299 A1    May 2, 2019

Related U.S. Application Data

(60) Provisional application No. 62/503,495, filed on May 9, 2017.

(51) Int. Cl.
*G06N 20/00* (2019.01)
*G06N 3/02* (2006.01)

(52) U.S. Cl.
CPC ............... *G06N 20/00* (2019.01); *G06N 3/02* (2013.01)

(58) Field of Classification Search
None
See application file for complete search history.

(56) References Cited

PUBLICATIONS

Klašnja-Milićević, Aleksandra, Mirjana Ivanović, and Alexandros Nanopoulos. "Recommender systems in e-learning environments: a survey of the state-of-the-art and possible extensions." Artificial Intelligence Review 44.4 (2015): 571-604. (Year: 2015).*

Lytras, Miltiadis D., and Miguel Angel Sicilia. "The Knowledge Society: a manifesto for knowledge and learning." International Journal of Knowledge and Learning 1.1-2 (2005): 1-11. (Year: 2005).*

Shen, Li-ping and Rui-min Shen, "Ontology-based learning content recommendation", Int. J. Cont. Engineering Education and Lifelong Learning, vol. 15, Nos. 3-6, 2005, pp. 308-317. (Year: 2005).*

(Continued)

*Primary Examiner* — Vincent Gonzales (57) ABSTRACT

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method.

3 Claims, 9 Drawing Sheets (56) References Cited

PUBLICATIONS

Tarus, John K., Zhendong Niu, and Ghulam Mustafa, "Knoweldge-based recommendation: a review of ontology-based recommender systems fore-learning", Artif Intell Rev (2018) 50:21—48, published online Jan. 13, 2017. (Year: 2017).*

Batmaz Z, Yurekli A, Bilge A, Kaleli C. A review on deep learning for recommender systems: challenges and remedies. Artificial Intelligence Review. Jun. 2019;52(1): 1-37. (Year: 2019).*

* cited by examiner

| Consideration | Discovery Engine | Search Engine |
|---|---|---|
| Access of content | Push | Pull |
| Searchability | Implicit 'in-situ' Intent | Explicit Intent |
| Value | Find Unknown Unknowns | Find Known Unknowns |
| Enterprise Deployment | Solves "cold start" | Needs a "warm-up" phase |

# METHODS AND SYSTEMS FOR POLICY-BASED ENRICHMENT OF CONTENT BASED ON LEARNING CONTEXT

This application claims priority from U.S. Provisional Application No. 62/503,495, METHODS AND SYSTEMS FOR POLICY-BASED ENRICHMENT OF CONTENT BASED ON LEARNING CONTEXT and filed 9 May 2017. This application is hereby incorporated by reference in its entirety for all purposes.

BACKGROUND

How individuals discover and learn about content, products and services continues to evolve. Intelligent search has grown significantly in recent years. Services are now able to leverage intelligent search that combines context and intent to help individuals discover digital knowledge. For example, a search for 'doctors' or 'insurance' can return a map and additional location information for nearby insurance agents, their hours and their rating.

Furthermore, organizations may lack a way to identify experts in an organization based on user feedback. The organization may want to learn who can best teach data science in an organization or who is the most recognized expert in a specific skill can be found by doing a user survey.

BRIEF SUMMARY OF THE INVENTION

In one aspect, a computerized method useful for automated policy-based enrichment of educational content based on a learning context in an online educational platform comprising: with a policy plane, obtaining a learning context an educational content; with a content plane, obtaining the educational content; with a taxonomy plane, generating a hierarchical classification of entities in the policy plane and content plane; based on an output of the policy plane, content plane and the taxonomy plane: creating at least one learnable tags applying to the educational content; and receiving a user query for the educational content, based on the based on an output of the policy plane, content plane and the taxonomy plane of an organization that a user is in, using the learning tag to determine a relevancy of the educational content and returning the educational content to a user's educational application via a discovery engine.

BRIEF DESCRIPTION OF THE DRAWINGS

FIGS. 8 A-B illustrates an example system of an implicit knowledge graph and topic engine implementation, according to some embodiments.

The Figures described above are a representative set, and are not an exhaustive with respect to embodying the invention.

DESCRIPTION

Disclosed are a system, method, and article of method and system of policy-based enrichment of content based on learning context. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Cloud computing can involve deploying groups of remote servers and/or software networks that allow centralized data storage and online access to computer services or resources. These groups of remote serves and/or software networks can be a collection of remote computing services.

Policy can be a set of rules that are applied in a hierarchical way to a piece of content.

Learning content can be content that is transformed into "learning" content based on policy on a per-organization basis.

Subject-matter expert can be a person who is an expert in a particular area or topic.

Tag can be an index term assigned to a piece of information and/or a type of meta-information that captures knowledge about an information resource.

Exemplary Systems

Figure 1:
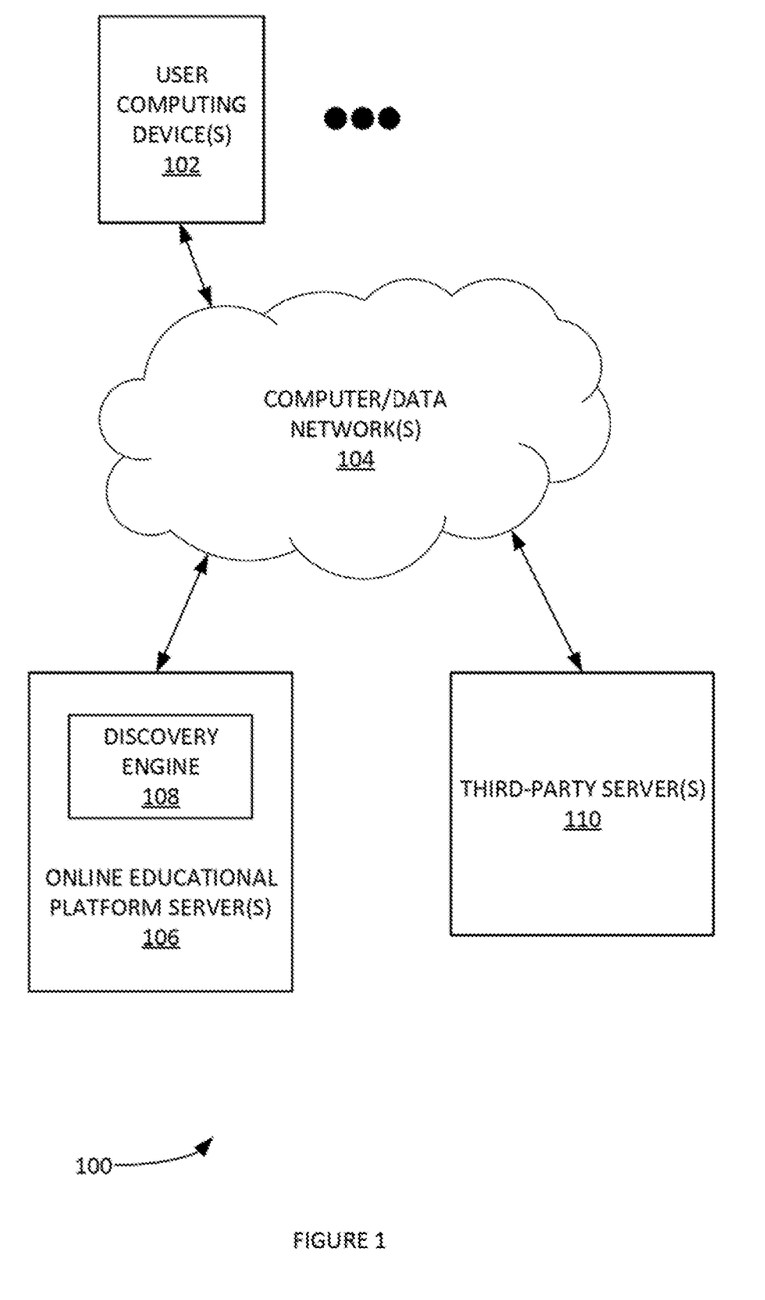
FIG. 1 illustrates an example system for shape recognition, according to some embodiments.

FIG. 1 illustrates an example system 100 for shape recognition, according to some embodiments. System 100 can provide policy-based enrichment of content based on learning context can drives learning effectiveness by providing real-time digital knowledge that allows the right users (e.g. within an organization) to locate the right content (e.g. content that is most relevant to them) at the right time (e.g. before a client/partner meeting). System 100 can drive learning effectiveness by providing real-time digital knowledge.

Networks 104 can include the Internet, text messaging networks (e.g. short messaging service (SMS) networks, multimedia messaging service (MMS) networks, proprietary messaging networks, instant messaging service networks, email systems, etc. Networks 104 can be used to communicate messages and/or other information (e.g. videos, tests, articles, other educational materials, etc.) from the various entities of system 100.

System 100 can include an online education platform server(s) 106. User-computing devices 102 can be any computing device used by a user to access/consume educational content provided by system 100 (e.g. via online education platform 106). Example user-computing devices can include, inter alia: personal computers, mobile devices, augmented reality devices, virtual reality devices, tablet computers, etc. User-computing devices 102 can access education content via a website, local application and the like. User-computing devices 102 can enable a user to upload educational content to online education platform 106. User-computing devices 102 can enable a user to upload test results to online education platform 106. User-computing devices 102 can enable a user to comment and/or otherwise interact with (e.g. 'like', share, recommend, etc.) the educational content provided by online education platform 106.

Online education platform 106 can manage and provide educational content to user-computing devices 102. For example, online education platform 106 can disseminate online courses, educational videos, educational articles, online exams, etc. Online education platform 106 can provide interfaces for obtaining user information. Online education platform 106 can interact with and/or obtain information from third-party server(s) 110.

Online education platform 106 can include various other functionalities and systems, including, inter alia: email servers, text messaging servers, instant messaging servers, video-sharing servers, mapping and geolocation servers, network security services, language translation functionalities, database management systems, application programming interfaces, etc. Online education platform 106 can include various machine learning functionalities that can analyze user behavior, educational content, user profiles, etc. The analysis can be used to match users with educational content and/or otherwise optimize the user experience.

Online education platform 106 can utilize machine learning techniques (e.g. artificial neural networks, etc.). Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning representation learning, similarity and metric learning, and/or sparse dictionary learning.

A discovery engine 108 can provide the following benefits depending on a customer's subscription level and enabled features. The discovery engine 108 can enable the discovery of Subject Matter Experts (SMEs) in an organization. The discovery engine 108 can enable obtaining Actionable Content based on Context and SME. The discovery engine 108 can enable aggregation and personalization of content based on your learning needs. The discovery engine 108 can enable control over digital knowledge. The discovery engine 108 can enable flexibility for optimized management of digital knowledge attributes. The discovery engine 108 can enable direct integrations with the most relevant services. In some examples, discovery engine 108 is the evolution of a search engine. The value of a discovery engine can be to find unknown unknowns in a content repository (unlike a search engine—which tries to match the user specified query to results). Discovery engine 108 can surface relevant content based on variety of implicit signals (e.g. role/job function, etc.) and/or explicit signals (e.g. text query, etc.). Discovery engine 108 can infer different meanings for the same piece of content based on context. For example, the term "Einstein" can return results about Einstein the person or a Salesforce Einstein product depending on the person who is searching.

Figure 2:
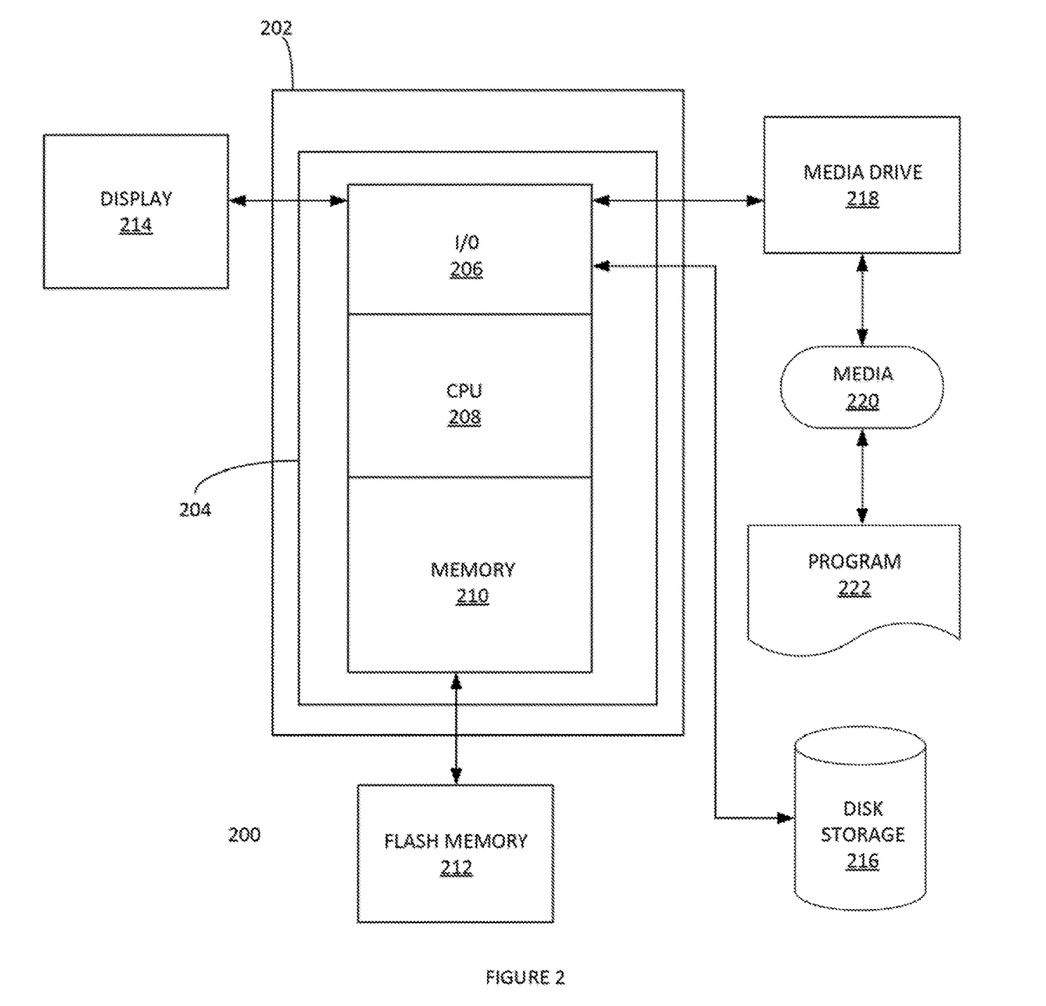
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
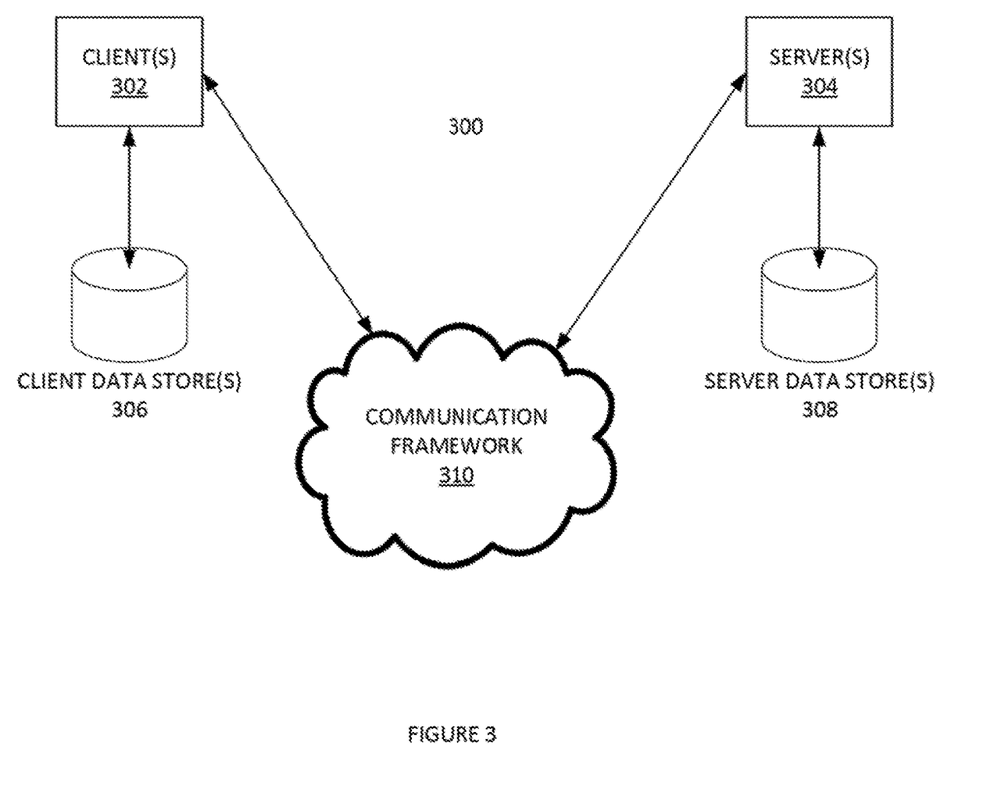
FIG. 3 is a block diagram of a sample computing environment that can be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform.

Exemplary Methods

Figure 4:
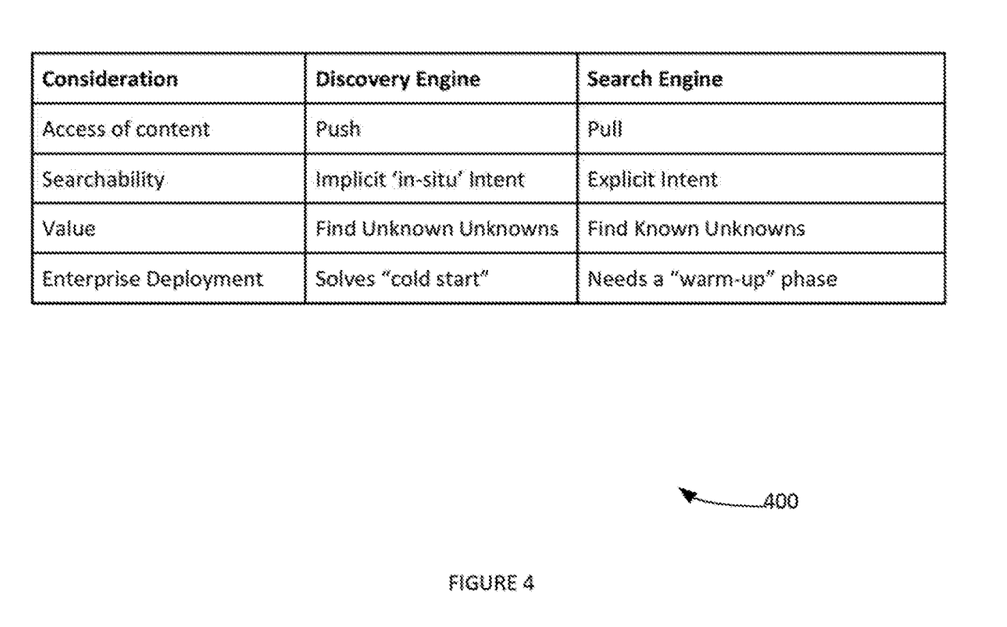
FIG. 4 provides an example table illustrating the differences between a discover engine and a search engine, according to some embodiments.

FIG. 4 provides an example table 400 illustrating the differences between a discovery engine and a search engine, according to some embodiments. For example, a discovery engine can enable content to be accessed using push notifications. A discovery engine can enable search functionality via an implicit 'in-situ' methodology. A discovery engine can use an intent value to find unknown unknowns. A discovery engine can utilize an enterprise deployment that solves various 'cold start' issues.

It is noted that a policy can include a set of rules that are applied in a hierarchical way to a piece of content (e.g. a learning content, etc.). A learning content can be transformed content based on a policy. This can be implemented on a per-organization basis. Example policies are now provided. It is noted that policies can be at multiple levels (e.g. organizational level, content level and/or learner level). Several enterprise/organization level examples are now provided. General Electric® may set SME content higher than free content. Pfizer® may set a policy with PubMed content rated the highest. An enterprise/organization can implement a manual over-ride with respect to content as well (e.g. channel programming, etc.).

Example content level policies are now discussed. In one example, Lynda® (and/or HBR®) can implement a special content access policy. For example, an organization can be required to subscribe to a learning content provider for users to access it. This is an example of a "self-describing policy". In a self-describing policy, the content can have policies attached to it in native form. A semantic understanding of content can be implemented at the content level as well.

Example individual/learner level policies are now discussed. For example, an explicit-role definition can be implemented when a user on-boards and specifies topics and roles for content. In an implicit role, process 400 can infer roles and tasks that a user does based on email/calendar. For example, process 400 can obtain this information from a user's digital calendar. Based on an analysis of the user's calendar, process can infer a user's role/job (e.g. engineer, sales, manager, etc.).

At a machine-learned level, process 400 can determine that content 'x' has more engagement for a specified level and/or entity. For example, machine-learning can be used to assign a content to an organization, individual, etc. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Figure 5:
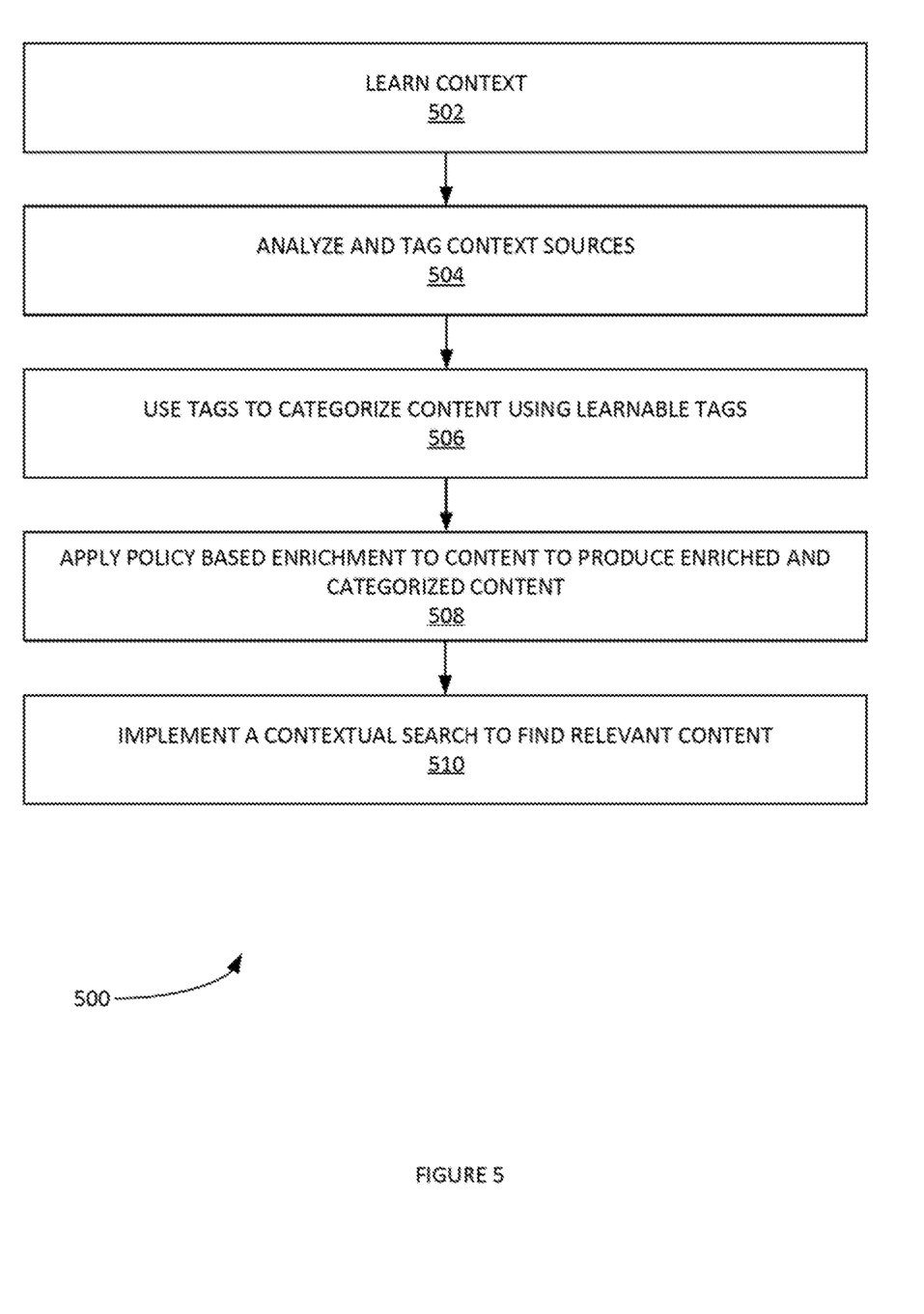
FIG. 5 illustrates an example process for implementing a content discovery engine, according to some embodiments.

FIG. 5 illustrates an example process 500 for implementing a content discovery engine, according to some embodiments. In step 502, process 500 can learn context. For example, step 502 can ingest entity roles, tasks, industry(s), domains, etc. In step 504, process 500 can analyze and tag context sources. Content sources can include, inter alia: content sources from SME sources, internal sources, premium sources, external sources, etc. In step 506, process 500 can use tags to categorize content using learnable tags. For example, step 506 can use tags to categorize any piece of content using learnable tags (e.g. via taxonomies/ontology). Step 506 can add tags to pieces of content. These tags can be in the learning context. For example, a piece of content can be tagged to be relevant to sales role in an organization and not relevant to anyone else. In step 508, process 500 can apply policy-based enrichment to content to produce enriched and categorized content. In one example, step 508 can apply a policy via a config file. In step 510, process 500 can implement a contextual search to find relevant content. A discovery engine can be used to implement step 510.

Figure 6:
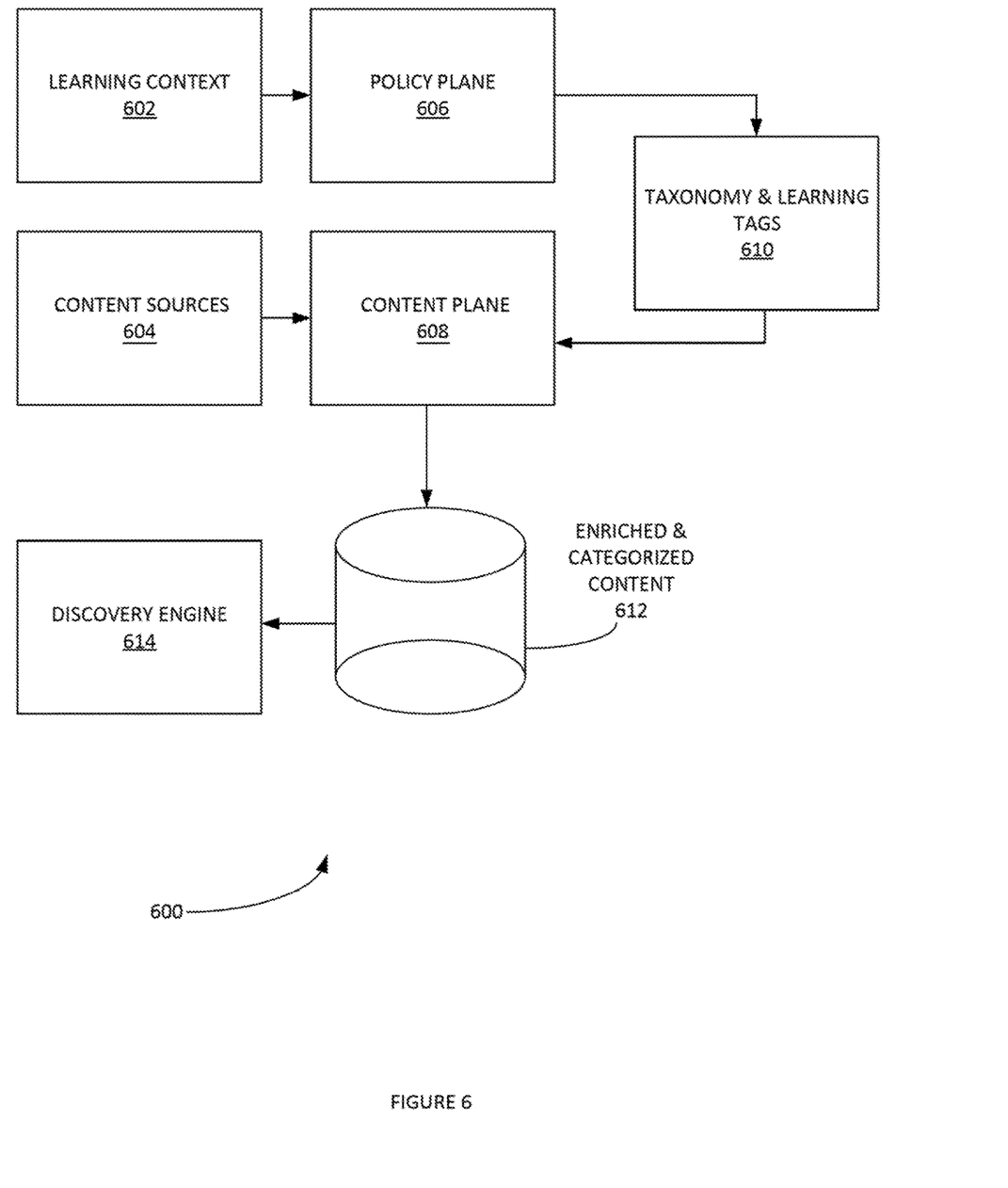
FIG. 6 illustrates another example process for implementing a content discovery engine, according to some embodiments.

FIG. 6 illustrates another example process 600 for implementing a content discovery engine, according to some embodiments. Content discovery engine process 600 has three components. A first component is the content plane 608 that ingests all content such as: external content, internal content, SME content and premium content is ingested. Policy plane 604 can acquire learning context 602. Learning context 602 can include all context about users in organizations implementing the online educational platform. This can include, inter alia: roles, tasks, applicable industry, domains etc. Taxonomy 610 can include hierarchical classification of entities in the policy plane and content plane. Based on these three components, learnable tags 610 are created and applied to every piece of content. When an end user needs to discover new learning content, based on the taxonomy, content plane and policy plane of the organization that the user is in, relevant content is surfaced by the discovery engine.

Figure 7:
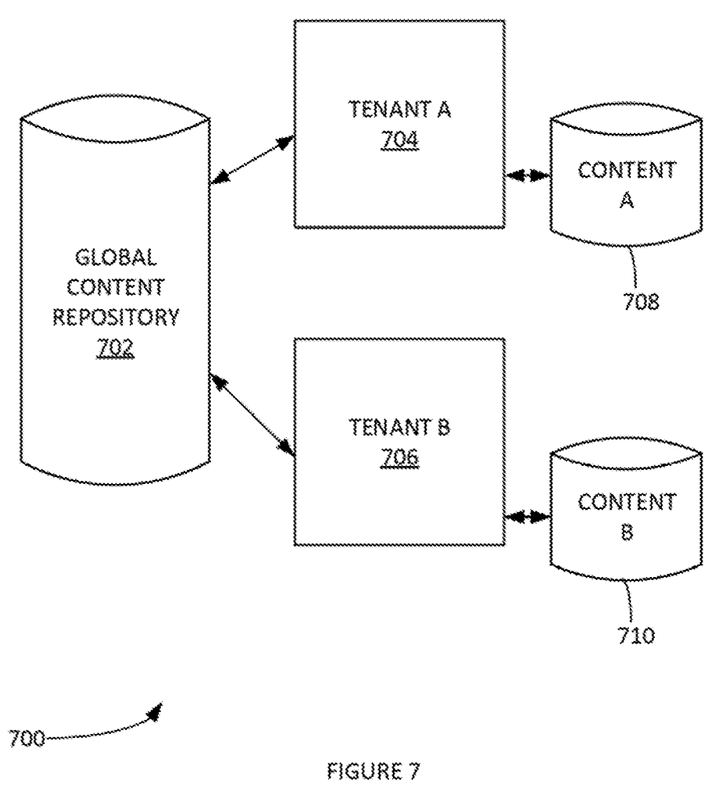
FIG. 7 illustrates a process of multi-taxonomy categorization, according to some embodiments.

FIG. 7 illustrates a process 700 of multi-taxonomy categorization, according to some embodiments. A discovery engine can be used to obtain multi-taxonomy categorization of content. Multi-taxonomy categorization allows the discovery of different meanings for the same piece of content. A discovery engine system can have a notion of multiple taxonomies (e.g. skills, products, industry specific, etc.). Process 700 can attach multiple taxonomy on a per enterprise/tenant. Process 700 can also provide 'live/online' taxonomy. A skills taxonomy is a hierarchical relationship between different skill entities. A product taxonomy is a hierarchical relationship between product entities for a specific industry or company. A multi-taxonomy categorization would apply a skill taxonomy followed by product taxonomy to a piece content.

Figure 8A:
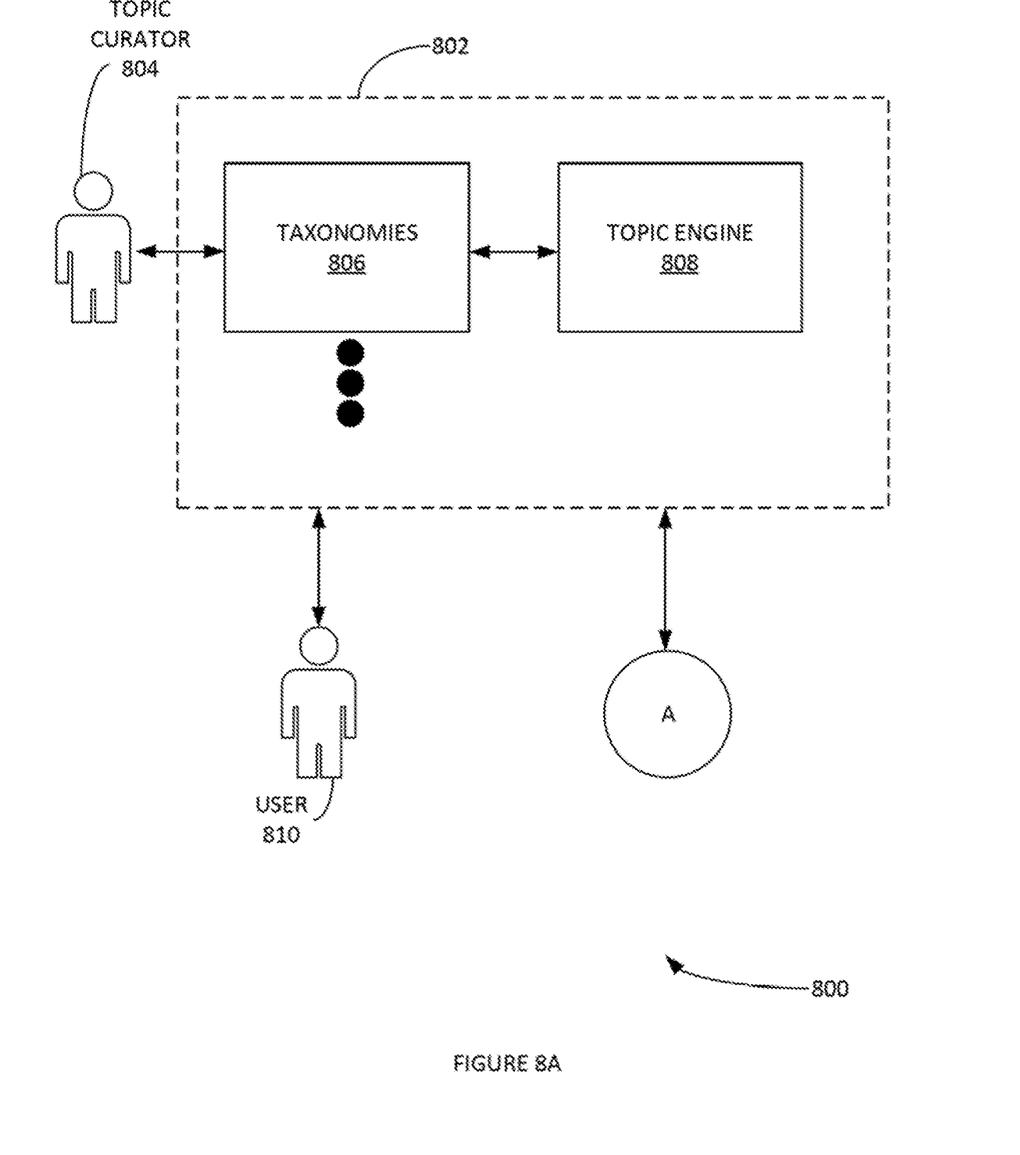
Figure 8B:
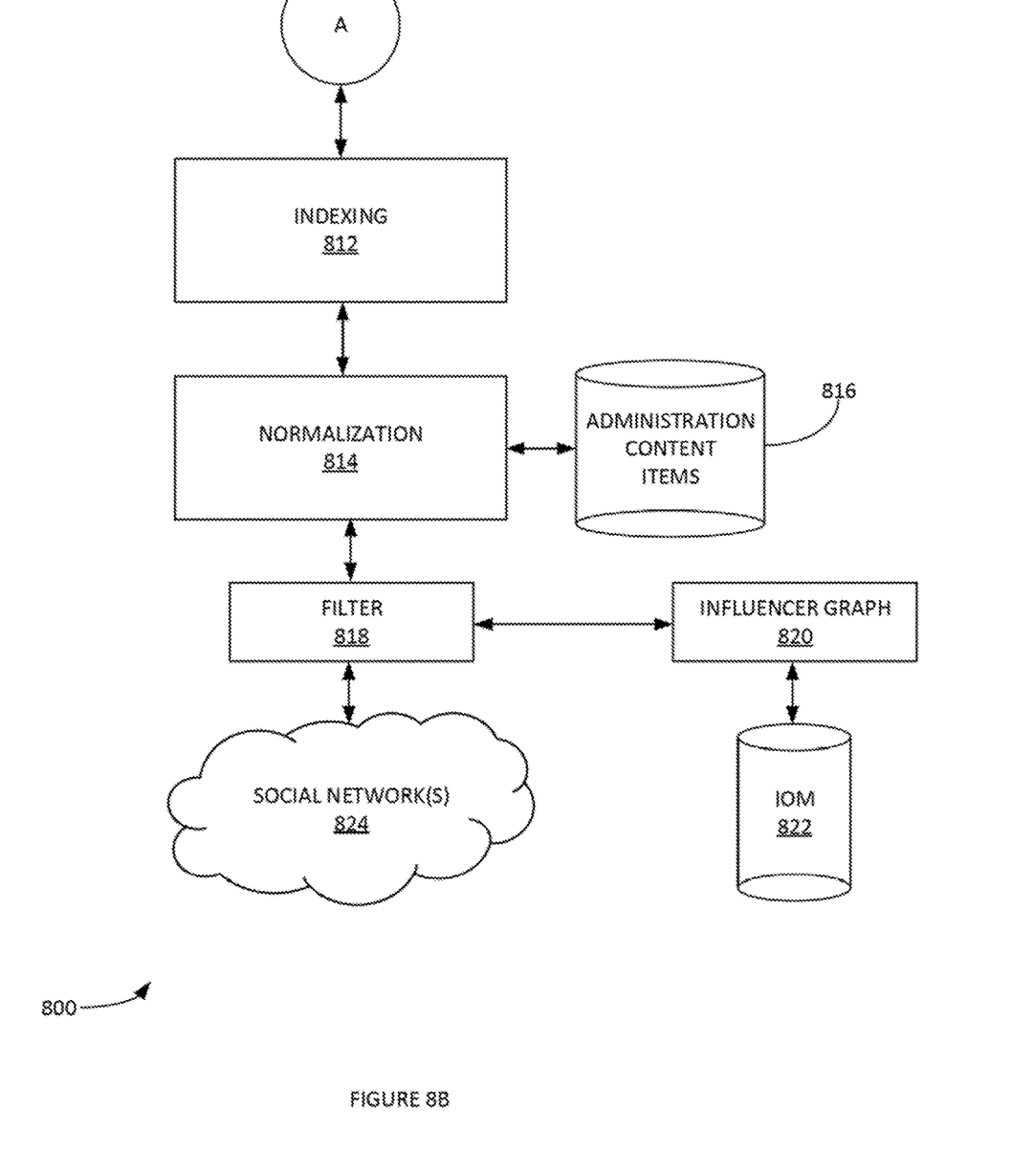

FIGS. 8 A-B illustrates an example system 800 of an implicit knowledge graph and topic engine implementation, according to some embodiments. System 800 can generate ranked topic feeds to a user. User input and responses can be used by machine-learning algorithms to train future iterations. A topic curator 804 can administer, select and manage topics based on relevant taxonomies 806 using an implicit-knowledge engine 802. The taxonomies 806 can be based on categorization. A topic engine 808 can implement mapping (e.g. topic to topic, topic to content, topic to users, etc.), taxonomy categorizations, etc.

Implicit-knowledge engine 802 can also receive an indexed 812, normalized 814 content from the modules of FIG. 8B. System 800 can crawl online social networks for content. This content can be supplemented with administrated content items 816 and IOM 822 (using an influencer graph 820).

Control over digital knowledge is now discussed. Accurate digital knowledge and enhanced, engaging content drive users into right content at the right time. The online education system can provide a platform that enables users to have a single interface for their information everywhere. Users can quickly gain control of their digital knowledge, including all learning content (e.g. external/internal, first party/third party, etc.), resulting in the elimination of inaccurate and duplicate data, helping to ensure that consistent and up to date digital knowledge is available.

Flexibility for optimized management of digital knowledge attributes is now discussed. The online learning system can enable businesses to develop structured digital knowledge using standardized schema.org-defined best practices that suit their business needs and is optimized for search and discovery. Schema.org is an open and collaborative initiative launched by some of the largest search engines that defines the vocabulary and format for structured data markup.

Direct Integrations with a set of most relevant services is now discussed. It is noted that digital knowledge can be posted on large online learning platforms. These can be coupled with a knowledge network of application(s), search engine(s), etc. to provide customers with the ability to access their digital knowledge and content across these various content sources with a single click (and/or other user input action(s)).

Conclusion

Although the present embodiments have been described with reference to specific example embodiments, various modifications and changes can be made to these embodiments without departing from the broader spirit and scope of the various embodiments. For example, the various devices, modules etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed:

1. A computerized method useful for automated policy-based enrichment of educational content based on a learning context in an online educational platform comprising:
   with at least one computer processer, obtaining a learning context of an educational content served by an online educational platform via a website;
   determining a context source of a learning content, wherein the learning content comprises an external content, an internal content, a subject-matter expert (SME) content and a premium content;
   tagging the context sources with a metadata tag that categorizes the educational content using one or more learnable tags, wherein a learnable tag comprises a multi-taxonomy categorization of the educational content wherein the learnable tag is relevant to a specified sales role in an organization;
   adding the learnable tag to the learning content;
   applying a policy-based enrichment to the educational content to produce enriched and categorized educational content; and
   implementing a contextual search to locate and retrieve a specified enriched and categorized educational content, and
   wherein the learning context comprises an entity role, a task type, an industry type, and domain types.

2. A computerized system useful for automated policy-based enrichment of content based on learning context in an online educational platform comprising:
   at least one processor configured to execute instructions;
   a memory containing instructions when executed on the processor, causes the at least one processor to perform operations that;
   obtain learning context of an educational content served by an online educational platform via a website;
   determine a context source of a learning content, wherein the learning content comprises an external content, an internal content, a subject-matter expert (SME) content and a premium content;
   tag the context sources with a metadata tag that categorizes the educational content using one or more learnable tags, wherein a learnable tag comprises a multi-taxonomy categorization of the educational content, wherein the learnable tag is relevant to a specified sales role in an organization;
   adding the learnable tag to the learning content;
   apply a policy-based enrichment to the educational content to produce enriched and categorized educational content; and
   implement a contextual search to locate and retrieve a specified enriched and categorized educational content, and
   wherein the learning context comprises an entity role, a task type, an industry type, and domain type.

3. A computerized method useful automated policy-based enrichment of educational content based on a learning context in an online educational platform comprising:
   with a policy plane, obtaining a learning context of an educational content served by an online educational platform via a website;
   with a content plane, obtaining the educational content, wherein the educational content comprises an external content, an internal content, a subject-matter expert (SME) content and a premium content;

with taxonomy plane, generating a hierarchical classification of entities in the policy plane and content plane;
based on an output of the policy plane, content plane and the taxonomy plane:
creating at least one learnable tags applying to the educational content wherein the learnable tag is relevant to a specified sales role in an organization;
adding the learnable tag to the educational content; and
receiving a user query for the educational content, based on the based on an output of the policy plane, content plane and the taxonomy plane of an organization that a user is in, using the learning tag to determine a relevancy of the educational content and returning the educational content to a user's educational application via a discovery engine.

* * * * *